(12) United States Patent
Morita et al.

(10) Patent No.: US 10,726,161 B2
(45) Date of Patent: Jul. 28, 2020

(54) INFORMATION PROCESSING DEVICE AND MALICIOUS MESSAGE DETECTION METHOD

(71) Applicant: Hitachi Automotive Systems, Ltd., Hitachinaka-shi, Ibaraki (JP)

(72) Inventors: Nobuyoshi Morita, Tokyo (JP); Makoto Kayashima, Tokyo (JP); Kouta Ideguchi, Tokyo (JP); Toru Owada, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 125 days.

(21) Appl. No.: 15/772,994

(22) PCT Filed: Oct. 20, 2016

(86) PCT No.: PCT/JP2016/081082
§ 371 (c)(1),
(2) Date: May 2, 2018

(87) PCT Pub. No.: WO2017/077868
PCT Pub. Date: May 11, 2017

(65) Prior Publication Data
US 2018/0314857 A1 Nov. 1, 2018

(30) Foreign Application Priority Data
Nov. 6, 2015 (JP) .................................. 2015-218336

(51) Int. Cl.
*G06F 21/64* (2013.01)
*G09C 1/00* (2006.01)
(Continued)

(52) U.S. Cl.
CPC .............. *G06F 21/64* (2013.01); *G06F 21/44* (2013.01); *G09C 1/00* (2013.01); *H04L 9/0662* (2013.01);
(Continued)

(58) Field of Classification Search
CPC .......... G06F 21/64; H04L 9/32; H04L 63/123
See application file for complete search history.

(56) References Cited

U.S. PATENT DOCUMENTS 6,321,150 B1 * 11/2001 Nitta ...................... B60K 6/543
701/32.7
6,367,014 B1 4/2002 Proust et al.
(Continued)

FOREIGN PATENT DOCUMENTS

| JP | 10-190651 A | 7/1998 |
|----|-------------|--------|
| JP | 2000-514625 A | 10/2000 |

(Continued)

OTHER PUBLICATIONS

Japanese-language Office Action issued in counterpart Japanese Application No. 2015-218336 dated Mar. 5, 2019 with English translation (seven (7) pages).
(Continued)

Primary Examiner — Thaddeus J Plecha
(74) Attorney, Agent, or Firm — Crowell & Moring LLP

(57) ABSTRACT

An information processing device that receives, from another information processing device, a communication message generated based on recency information and control data, includes: a recency information generation unit that generates the recency information; and a recency information management unit that extracts the recency information from the received communication message.

10 Claims, 8 Drawing Sheets

(51) Int. Cl.
*H04L 9/06* (2006.01)
*H04L 9/12* (2006.01)
*G06F 21/44* (2013.01)
*H04L 29/06* (2006.01)
*H04L 9/08* (2006.01)
*H04L 9/32* (2006.01)
*H04L 12/40* (2006.01)
*H04L 29/08* (2006.01)

(52) U.S. Cl.
CPC ............ *H04L 9/088* (2013.01); *H04L 9/0891* (2013.01); *H04L 9/12* (2013.01); *H04L 9/32* (2013.01); *H04L 12/40* (2013.01); *H04L 63/123* (2013.01); *H04L 63/14* (2013.01); *H04L 63/145* (2013.01); *H04L 67/12* (2013.01); *H04L 2012/40215* (2013.01); *H04L 2012/40273* (2013.01)

(56) References Cited

U.S. PATENT DOCUMENTS

| | | | |
|---|---|---|---|
| 9,231,936 B1* | 1/2016 | Wang | H04L 63/08 |
| 9,705,678 B1* | 7/2017 | Wang | G06F 21/44 |
| 2004/0088626 A1* | 5/2004 | Ichino | G01R 31/31834 |
| | | | 714/738 |
| 2006/0171541 A1* | 8/2006 | Horn | H04L 63/062 |
| | | | 380/278 |
| 2007/0113085 A1 | 5/2007 | Naslund et al. | |
| 2009/0169009 A1 | 7/2009 | Okamoto et al. | |
| 2010/0005133 A1* | 1/2010 | Choi | H03M 13/2742 |
| | | | 708/491 |
| 2011/0047202 A1* | 2/2011 | Ellison | G06F 21/40 |
| | | | 709/201 |
| 2014/0270163 A1* | 9/2014 | Merchan | H04L 9/0637 |
| | | | 380/46 |
| 2014/0310530 A1 | 10/2014 | Oguma et al. | |
| 2014/0344490 A1* | 11/2014 | Tsfaty | G06F 13/4286 |
| | | | 710/106 |
| 2015/0020152 A1* | 1/2015 | Litichever | H04L 63/14 |
| | | | 726/1 |
| 2015/0033016 A1* | 1/2015 | Thornton | H04L 9/0825 |
| | | | 713/171 |

FOREIGN PATENT DOCUMENTS

| | | |
|---|---|---|
| JP | 2009-508390 A | 2/2009 |
| JP | 2009-164695 A | 7/2009 |
| JP | 2012-249107 A | 12/2012 |
| JP | 2013-48374 A | 3/2013 |
| JP | 2013-98719 A | 5/2013 |
| JP | 2016-21700 A | 2/2016 |

OTHER PUBLICATIONS

International Search Report (PCT/ISA/210) issued in PCT Application No. PCT/JP2016/081082 dated Nov. 29, 2016 with English-language translation (Five (5) pages).

Japanese-language Written Opinion (PCT/ISA/237) issued in PCT Application No. PCT/JP2016/081082 dated Nov. 29, 2016 (Six (6) pages).

* cited by examiner

FIG.8

| CAN-ID | PROCESSING TYPE | RULE TYPE | VERIFICATION TARGET BIT |
|---|---|---|---|
| 0x2D1 | INSERT | COUNTER | {30,···,63} |
| 0x401 | INSERT | COUNTER | {0,···,15} |
| 0x601 | XOR | FIXED | {36,···,52} |
| 0xD02 | XOR | RANGE | {0, 623343} |
| 0xEE1 | XOR | CHECKSUM | {56,···,63} |
| ... | | ... | ... |

VERIFICATION RULE INFORMATION (81) — columns 811, 812, 813, 814

INFORMATION PROCESSING DEVICE AND MALICIOUS MESSAGE DETECTION METHOD

TECHNICAL FIELD

The present invention relates to an information processing device and a malicious message detection method.

BACKGROUND ART

As a representative standard protocol in an in-vehicle network of automobiles, a CAN (Controller Area Network) is in widespread use. With this kind of in-vehicle network, there is a possibility that an unauthorized device may be connected to an interface which is directly connected to an in-vehicle network such as an OBD 2 (On-Board-Diagnostics 2) port, and a replay attack may be carried out from such unauthorized device. Here, the term "replay attack" refers to an attack of intercepting and acquiring a message on a communication path in advance, and retransmitting the acquired message to induce unauthorized operations. Moreover, there is also a possibility that an information processing device linked with a system outside the vehicle may be infected with malware.

Normally, to deal with the foregoing threats, it would be effective to perform message authentication using a MAC (Message Authentication Code) as a falsification detection code to the message being transferred between the respective information processing devices. For instance, Japanese Laid-Open Patent Publication No. 2013-098719 (PTL 1) discloses a communication system which embeds a MAC in a message on an in-vehicle network. With the communication system described in PTL 1, each information processing device counts the number of times that a message was sent for each message ID. The transmitting-side information processing device generates a MAC from the data, number of transmissions, and message ID. The receiving-side information processing device calculates the MAC based on the data, number of transmissions and message ID in the received message, and compares the calculated MAC with the separately received MAC. When the calculated MAC and the received MAC are different, the receiving-side information processing device takes measures against replay attack and malware infection while subsequently refraining from receiving messages of that message ID.

CITATION LIST

Patent Literature

[PTL 1] Japanese Laid-Open Patent Publication No. 2013-098719

SUMMARY OF INVENTION

Technical Problem

Nevertheless, with the communication system described in PTL 1, because two messages; specifically, a message containing the MAC and a message containing the control data, need to be sent, there is a problem in that the number of messages will increase.

Solution to Problem

According to the 1st aspect of the present invention, an information processing device that receives, from another information processing device, a communication message generated based on recency information and control data, comprises: a recency information generation unit that generates the recency information; and a recency information management unit that extracts the recency information from the received communication message.

According to the 2nd aspect of the present invention, a method of detecting whether a communication message generated by one information processing device based on recency information and control data is a malicious message, in another information processing device, comprises: generating the recency information by a processor of the one information processing device; and extracting the recency information from the communication message by a processor of the other information processing device.

Advantageous Effects of Invention

According to the present invention, a communication message can be verified without increasing the number of messages.

BRIEF DESCRIPTION OF DRAWINGS

FIG. 8 is a diagram showing an example of the table configuration of the verification rule information.

DESCRIPTION OF EMBODIMENTS

First Embodiment

An information processing device 20 of this embodiment is an in-vehicle information processing device 20. The information processing device 20 decrypts an encrypted message, which was encrypted using recency information that is shared only between the respective information processing devices 20, according to a predetermined verification rule. Here, the term "recency information" refers to information related to the newness of the communication message, and is, for instance, a sequence number string, a count value, or time information. The information processing device 20 determines whether the received message is a malicious or fraudulent message by verifying whether the decrypted message can be restored to a prescribed data structure. However, the technical concept of the present invention is not limited to the foregoing example. Note that the encryption key and seed to be used by the respective information processing devices 20 merely need to be safely distributed, managed and updated, and may also be distributed or updated at an arbitrary timing such as upon starting/stopping the engine, upon developing products, or upon performing maintenance.

Figure 1:
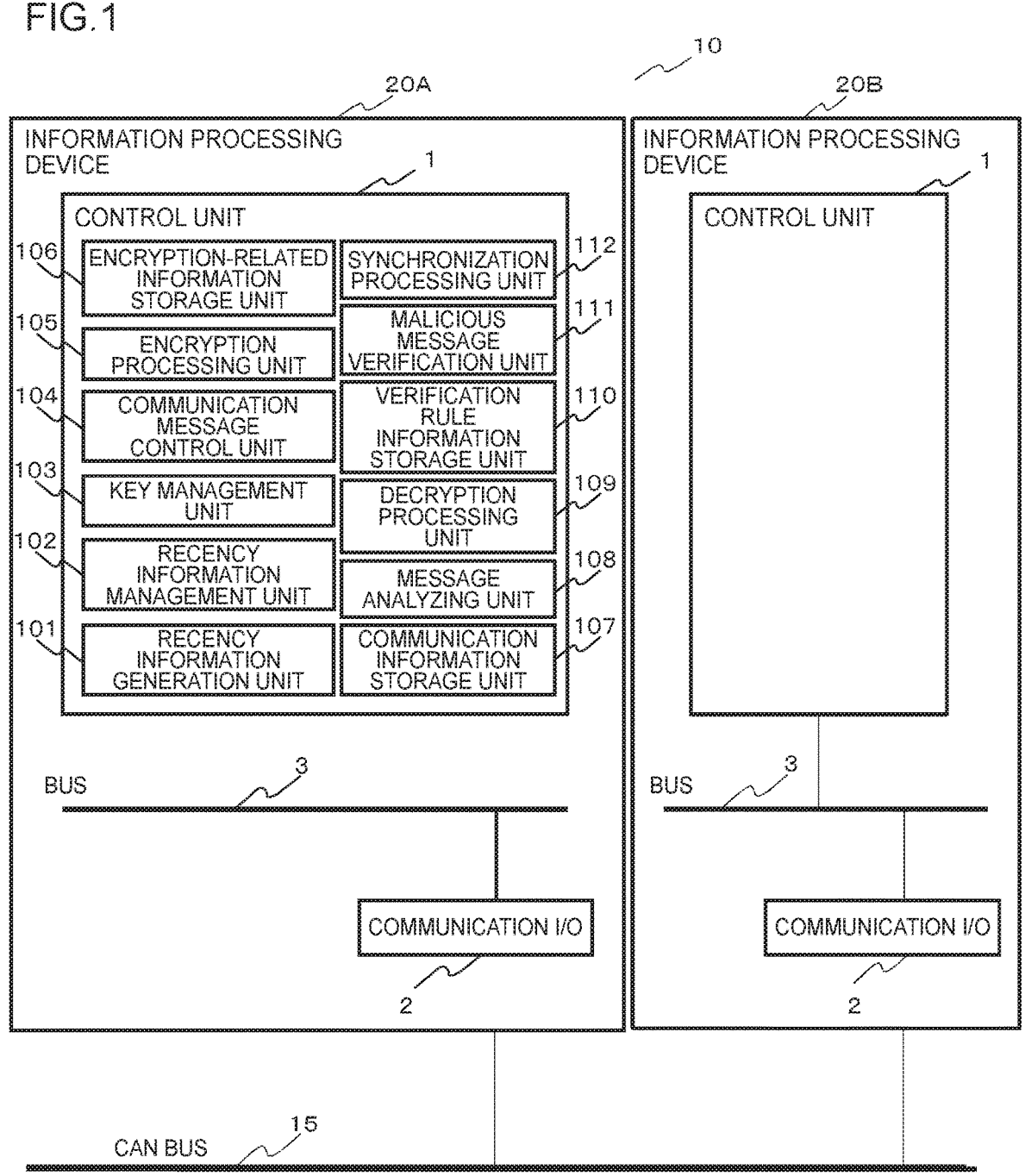
FIG. 1 is a block diagram showing a configuration example of the control unit.

FIG. 1 is a block diagram showing a configuration example of a control unit 10. The control unit 10 comprises a plurality of information processing devices 20A, 20B. The information processing devices 20A, 20B are mutually connected via a CAN bus 15. In the ensuing explanation, reference numeral 20 may also be used as a representative to explain the information processing devices 20A, 20B. The information processing device 20 comprises a control unit 1 and a communication I/O 2 which are mutually connected via a bus 3. Note that the present invention can also be applied to a control unit 10 comprising three or more information processing devices 20.

The control unit 1 is configured by including an arithmetic processing device equipped with a processor such as a CPU or a FPGA, a ROM and a RAM as storage devices, and other peripheral circuits. The processor controls the respective hardware in the device by executing the programs stored in the storage device. The respective programs may be stored in advance in the storage device within the information processing device, or downloaded from another device into the storage device, as needed, via an I/O interface and a medium that can be used by the information processing device 20 by equipping the information processing device 20 with an I/O interface in advance. Here, the term "medium" may be, for instance, a storage medium that can be removably attached to an I/O interface, or a communication medium (that is, a wired network, a wireless network or an optical network, or carrier waves or digital signals that propagate through such network).

The control unit 1 functionally comprises a recency information generation unit 101 which generates recency information to be shared between the respective information processing devices 20, a recency information management unit 102 which updates the recency information according to the number of messages or the type of message being transferred between the information processing devices, a key management unit 103 which manages the encryption/decryption processing and the key data that is used for generating recency information, a communication message control unit 104 which generates a message to be transmitted, an encryption processing unit 105 which encrypts the message, an encryption-related information storage unit 106 which stores information related to encryption utilization technology such as the initial value, key data, and recency information upon performing the encryption/decryption processing, and a communication information storage unit 107 which stores information such as the counter value of the message transferred on the communication path which is required for the message transmission/reception processing.

In addition, the control unit 1 functionally comprises a message analyzing unit 108 which analyzes the data structure of the received message, a decryption processing unit 109 which decrypts the message based on the data structure analyzed by the message analyzing unit 108, a verification rule information storage unit 110 in which predetermined rules are defined, a malicious message verification unit 111 which verifies the completeness of the message decrypted based on the rule acquired from the verification rule information storage unit 110, and a synchronization processing unit 112 which synchronizes the recency information between the respective information processing devices.

The communication I/O 2 receives an outgoing message from another information processing device 20 via a communication path, and performs some kind of physical operation. Moreover, the communication I/O 2 sends some kind of message to another information processing device 20 via a communication path. The communication path is, for example, the CAN bus 15.

Figure 2:
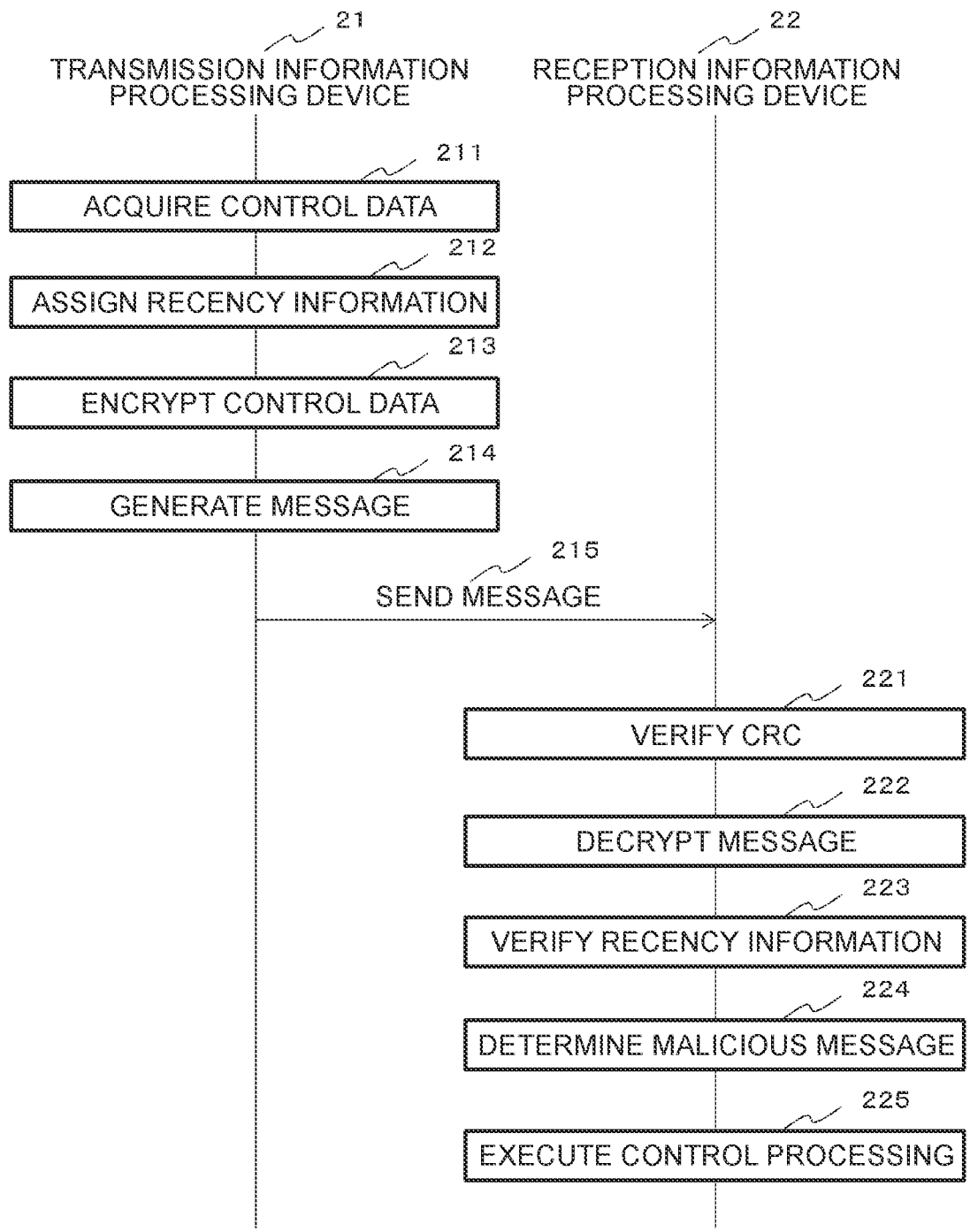
FIG. 2 is a flowchart showing an example of the processing performed in the control unit.

FIG. 2 is a flowchart showing an example of the processing performed in the control unit 10. Here, the following explanation is provided with the information processing device 20A as the transmission information processing device 21, and with the information processing device 20B as the reception information processing device 22. Accordingly, this flowchart illustrates the malicious message detection processing sequence between the transmission information processing device 21 and the reception information processing device 22. Note that the transmission information processing device 21 and the reception information processing device 22 are depicted as examples of an information processing device which sends a message and an information processing device which receives a message among the plurality of information processing devices 20.

In step 211, the communication message control unit 104 acquires the control data sent from the transmission information processing device 21. In step 212, the recency information management unit 102 acquires, from the encryption-related information storage unit 106, the recency information generated by the recency information generation unit 101, and assigns the recency information to the control data acquired in step 211 based on a predetermined rule. In step 213, the encryption processing unit 105 acquires the encryption key from the key management unit 103, and encrypts the control data to which the recency information was assigned in step 212.

In step 214, the communication message control unit 104 assigns header information and footer information such as a CAN-ID to the control data encrypted in step 213, and thereby generates a communication message. In step 215, the communication message control unit 104 sends the communication message generated in step 214 to the reception information processing device 22.

In step 221, the communication message control unit 104 performs CRC verification defined based on the CAN communication protocol, discards the received communication message upon detecting an error in the CRC verification, and performs predetermined error processing. In step 222, the decryption processing unit 109 acquires the key to be used in the decryption processing from the key management unit 103, and decrypts the message which was determined to be free from error in the CRC verification in step 221.

In step 223, the recency information management unit 102 performs processing to the message decrypted in step S222 based on a predetermined verification rule linked to the ID that is assigned for each type of communication message. In step 224, the malicious message verification unit 111 acquires the verification rule that is determined by being linked to the ID, which is assigned from the verification rule information storage unit 110 for each type of communication message, for the message obtained in the processing of step 223. The malicious message verification unit 111 performs the determination processing according to the verification rule, and performs predetermined error processing upon deviating from the verification rule. In step 225, the communication message control unit 104 executes standard control processing when it is determined that the verification rule is being observed in step 224.

Based on the steps described above, the transmission information processing device 21 can send a message to the reception information processing device 22, and the reception information processing device 22 can determine whether the received message is a malicious message.

Figure 3:
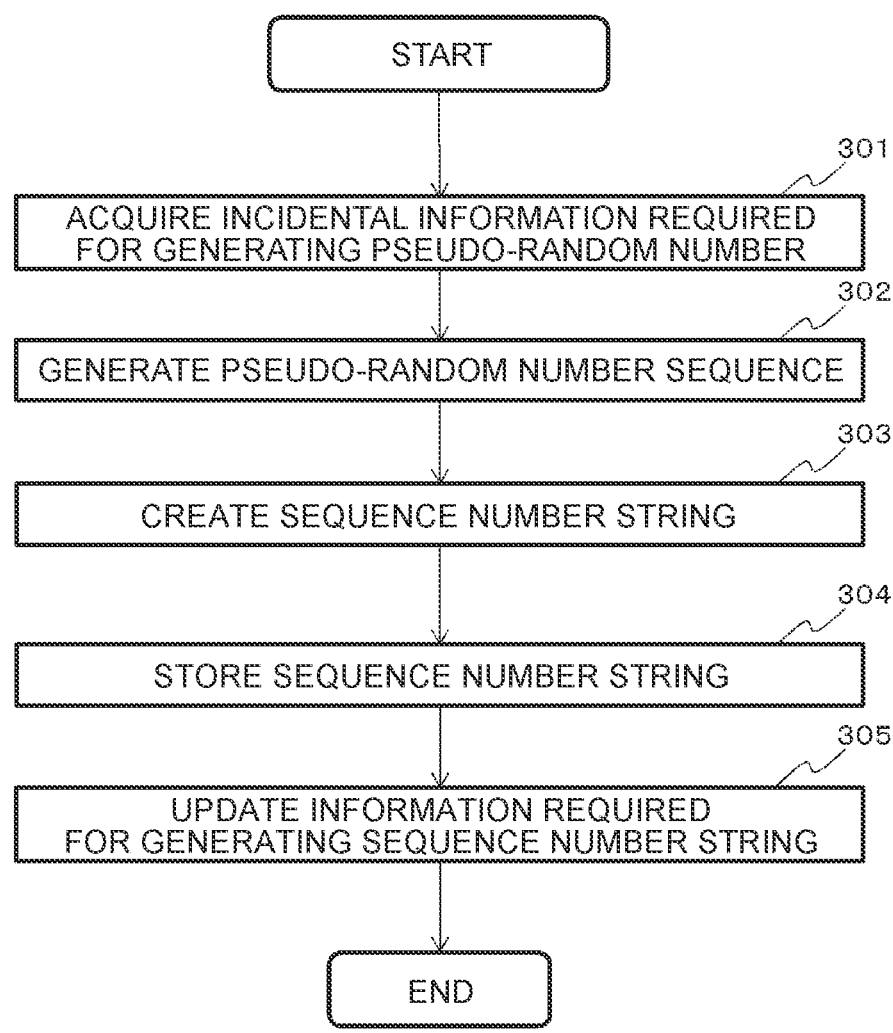
FIG. 3 is a flowchart showing an example of the generation processing of recency information performed in the information processing device.

FIG. 3 is a flowchart showing an example of the recency information generation processing performed in the information processing device 20. FIG. 3 shows a schematic processing flow of generating a sequence number by using a pseudo-random number generator as an example of the recency information generated by the information processing device 20 when the engine is started, immediately before the communication between information processing devices, or in between the communication between the information processing devices.

In step 301, the recency information management unit 102 acquires the seed of the pseudo-random number generator, the auxiliary information for generating the pseudo-random number, or the internal state of the pseudo-random number generator. These are incidental information required for generating a sequence number from the encryption-related information storage unit 106 by using information indicating the referral destination of the incidental information required for generating the sequence number. Here, the auxiliary information for generating a pseudo-random number is, for example, an initial value (IV) as one input of the pseudo-random number generator. Moreover, the internal state of the pseudo-random number generator refers to information required for generating a random number subsequent to the output random numbers.

In step 302, the recency information generation unit 101 generates a pseudo-random number sequence by using the seed, or the auxiliary information, or the internal state acquired in step 301. In step 303, the recency information generation unit 101 creates a sequence number string (or a sequential number sequence) according to a predetermined method from the pseudo-random number sequence generated in step 302. In step 304, the recency information management unit 102 stores the sequence number string generated in step 303 as the recency information in the encryption-related information storage unit 106. Note that the recency information may also be stored in the memory, or stored in the secondary storage device.

In step 305, the recency information management unit 102 updates information for determining whether the generation of a sequence number is required, and ends the processing.

Here, information for determining whether the generation of a sequence number is required, may be, for instance, information corresponding to the number of pseudo-random number sequences that were generated for use in the sequence number, and information corresponding to the initial address of an unused pseudo-random number. For example, when the data size of the sequence number is b bits and pseudo-random numbers in an amount of b×m bits have been generated, the number of pseudo-random number sequences will be m. Moreover, when b bits' worth of pseudo-random numbers are acquired upon acquiring a sequence number as the recency information, the number of pseudo-random number sequences is updated from m to m−1, and the initial address is updated to the initial address of the next b-bit pseudo-random number.

Note that, in the pseudo-random number generation processing of step 302, the predetermined number may be shared between the respective information processing devices 20 in advance, and the seed may be updated each time the byte length of pseudo-random number sequences generated from one seed reaches a predetermined number. The seed may be updated, for example, by a certain information processing device generating a seed when the byte length of pseudo-random number sequences generated from one seed reaches a predetermined number, encrypting the updating seed as a plain text, and sending the encrypted updating seed to another information processing device 20. However, so as long as the method is able to update the seed, the method of updating the seed is not limited to the foregoing method. As a result of updating the seed, an effect is yielded in that it becomes more difficult for a third party, who does not know the seed, to predict the sequence number.

Based on the steps described above, the information processing device 20 can generate recency information to be shared between the respective information processing devices.

Figure 4:
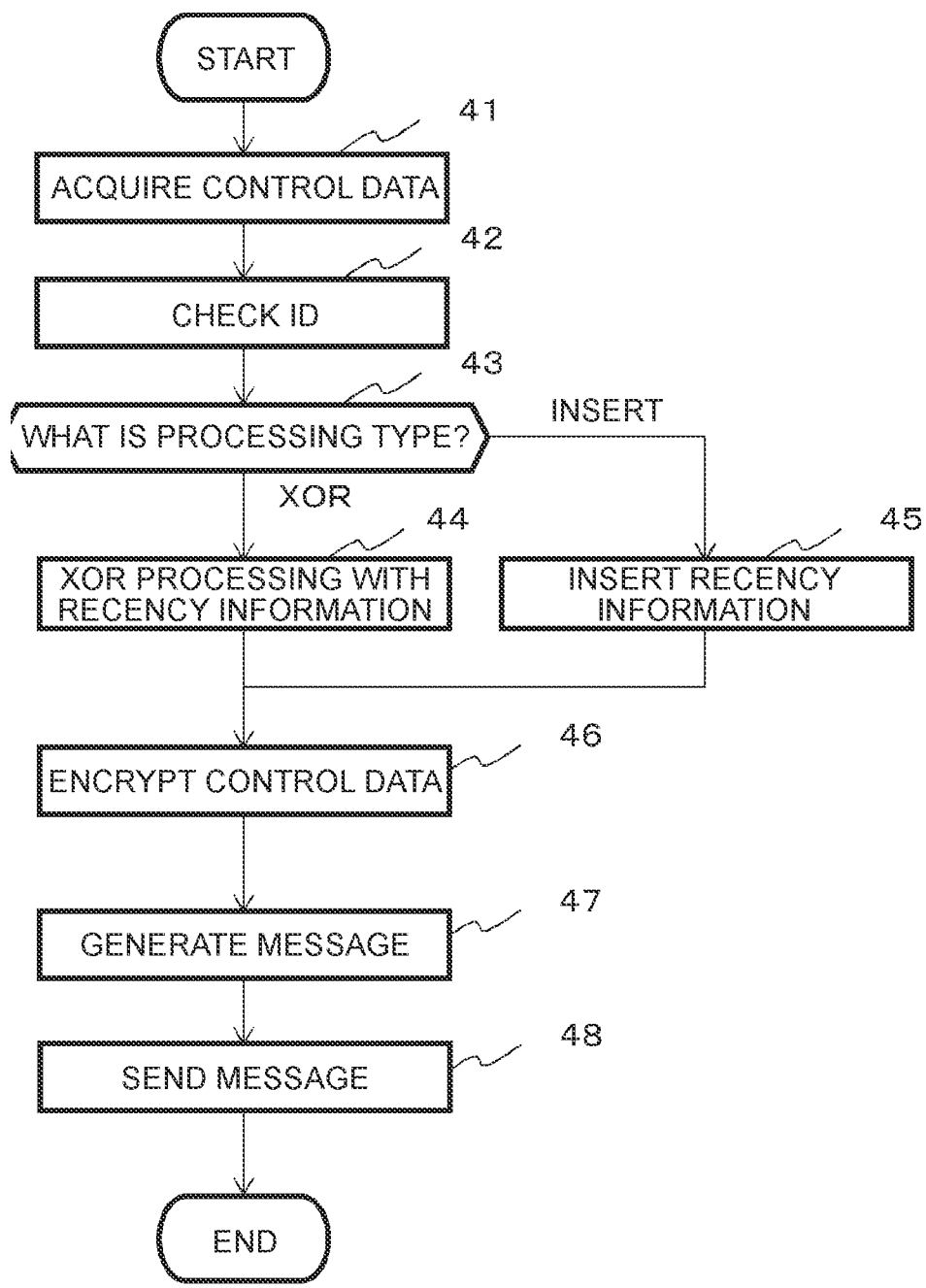
FIG. 4 is a flowchart showing an example of the processing, upon sending a communication message, performed in the information processing device.

FIG. 4 is a flowchart showing an example of the processing, upon sending a communication message, performed in the information processing device 21. FIG. 4 shows a schematic processing flow from step 211 to step 215 of FIG. 2 of generating a message for the transmission information processing device 21 to determine whether a message is a malicious message, and sending the generated message. Before starting the processing flow of FIG. 4, the processing of step 301 to step 305 shown in FIG. 3 may be performed. Here, the recency information management unit 102 refers to the information, stored in the encryption-related information storage unit 106, for determining whether the generation of the sequence number is required, and, when the generation of the sequence number is required, performs the sequence number string generation processing by using the incidental information required for generating the sequence number stored in the encryption-related information storage unit 106, and skips this processing when the generation of the sequence number is not required.

In step 41, the communication message control unit 104 acquires the control parameter information for use in the drive control of the vehicle from a sensor device or the like equipped in the transmission information processing device 21. In step 42, the communication message control unit 104 checks the CAN-ID prescribed for each type of control data acquired in step 41, and determines the processing type.

FIG. 8 is a diagram showing an example of the table configuration of the verification rule information 81. In other words, the table configuration shown in FIG. 8 is an example of the verification rule information 81 stored in the verification rule information storage unit 110 referred to in step 42. The CAN-ID 811 shows the information for identifying the control data to be assigned to the message; that is, the ID information of the message. In FIG. 8, the CAN-ID 811 is used as the CAN-ID as an example of the information for identifying the control data to be assigned to the message, but information other than the CAN-ID may also be used so as long as it is information capable of identifying the control data to be assigned to the message.

The processing type 812 shows the processing method of assigning the recency information to the message that uses the value of the CAN-ID 811. When the processing type is "insert", the recency information is inserted into the free space of the data field; that is, the recency information is added to the control data. When the processing type is "XOR", the exclusive OR (XOR) processing of the control data and the recency information is performed. For example, as the location of inserting the recency information, the verification target bits 814 described later may be used, or the recency information may be inserted into predetermined bits. The recency information is thereby assigned to the control data within a range of a predetermined data length.

The rule type 813 shows information for identifying the verification method of the message that uses the value of the CAN-ID 811 in the malicious message determination processing of step 224. The verification target bits 814 show the bit value to be verified in the verification of the message that uses the value of the CAN-ID 811.

In step 43, the communication message control unit 104 proceeds to step 44 when the processing type 812 corresponding to the CAN-ID 811 acquired in step 42 is "XOR", and proceeds to step 45 when the processing type 812 is "insert". In step 44, the recency information management unit 102 acquires the recency information generated in step 303 from the encryption-related information storage unit 106, and performs the exclusive OR processing with the control data acquired in step 41. In step 45, the recency information management unit 102 acquires the recency information generated in step 303 from the encryption-related information storage unit 106, and adds the recency information to the free space of the data field.

In step 46, the encryption processing unit 105 acquires the encryption key from the key management unit 103, and encrypts the control data to which the recency data was assigned in step 44 or step 45. In step 47, the communication message control unit 104 assigns header information and footer information such as a CAN-ID to the control data encrypted in step 46, and thereby generates a communication message.

Figure 5:
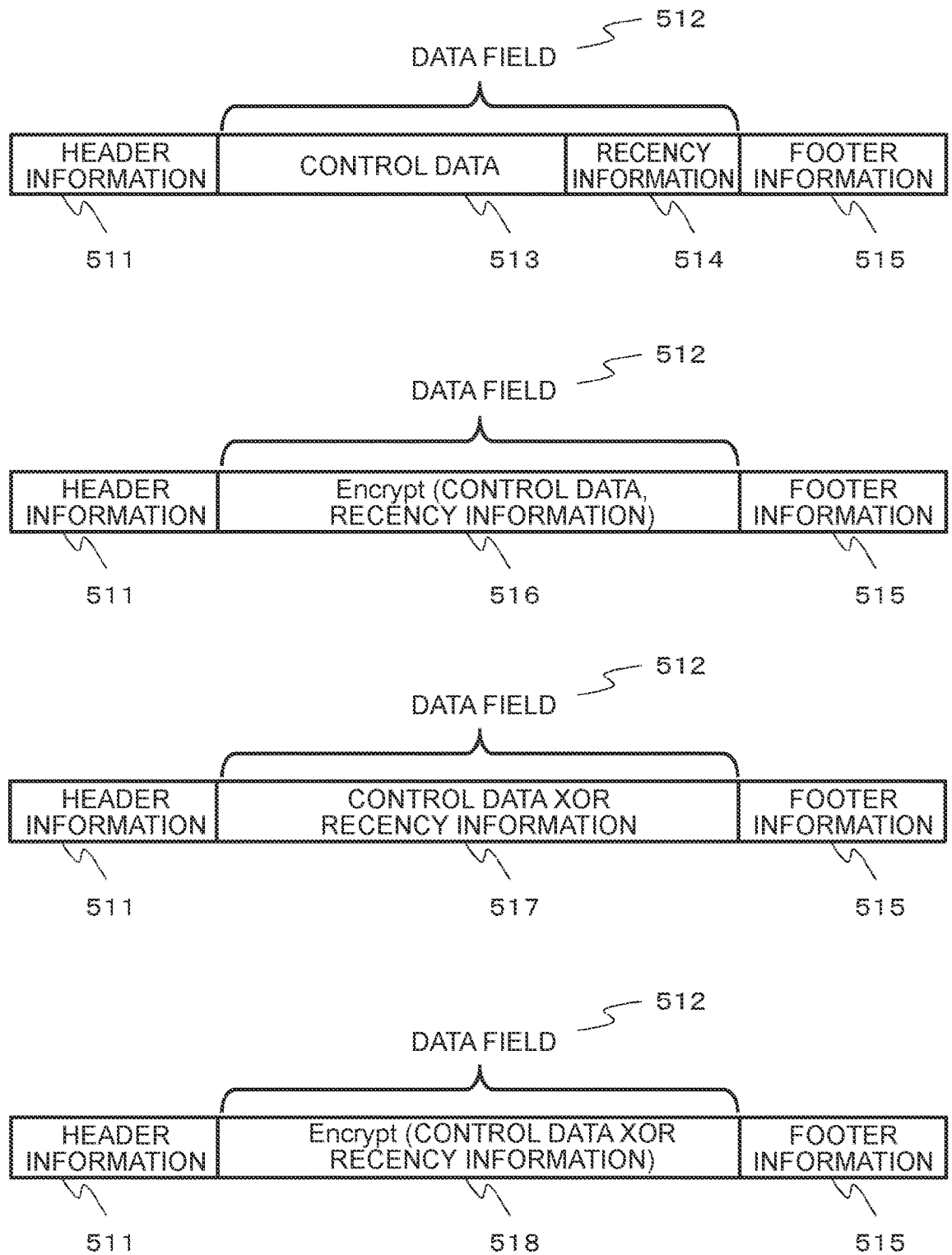
FIG. 5 is a diagram showing an example of the data structure of the communication message.

FIG. 5 is a diagram showing an example of the data structure of the communication message. The communication message is configured from header information 511, a data field 512, and footer information 515. The header information 511 is configured from information such as a CAN-ID. The data field 512 is of a payload length, and control data is assigned thereto. The footer information 515 is configured from information defined based on a protocol such as CRC (Cyclic Redundancy Check).

The data field 512 becomes "control data XOR recency information 517" when the exclusive OR of the control data and the recency information is calculated in step 44, and becomes "Encrypt (control data XOR recency information) 518" when encryption is performed in step 46. The data field 512 becomes a combination of the control data 513 and the recency information 514 when the recency information is assigned to the control data in step 45, and becomes "Encrypt (control data, recency information) 516" when encryption is performed in step 46. In step 48, the communication message control unit 104 sends the communication message generated in step 47 via the communication I/O 2.

Based on the steps described above, the transmission information processing device 21 can generate a message for determining whether a received message is a malicious message, and send the generated message to the reception information processing device 22. Note that, in the foregoing steps, it is possible to only use unidentifiable information such as a pseudo-random number as the recency information and omit step 46 in order to lighten the processing.

Figure 6:
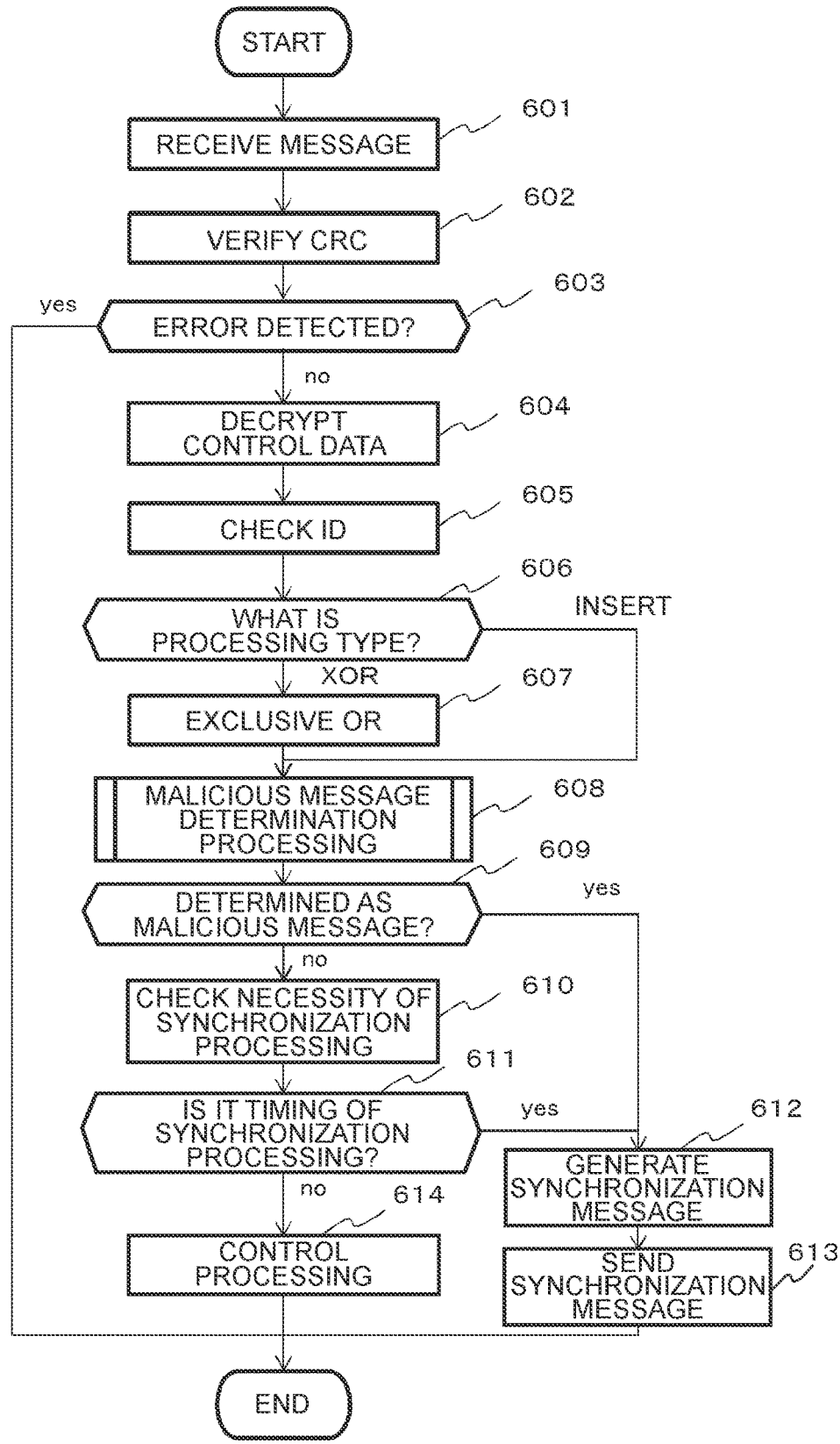
FIG. 6 is a flowchart showing an example of the processing, upon receiving a communication message, performed in the information processing device.

FIG. 6 is a flowchart showing an example of the processing, upon receiving a communication message, performed in the information processing device 20. FIG. 6 shows a schematic processing flow from step 221 to step 225 of FIG. 2 for analyzing the data structure of the received message by using the message analyzing unit 108 and determining whether the received message is a malicious message when the control unit 1 in the reception information processing device 22 receives the message of the data structure shown in FIG. 5.

In step 601, the communication message control unit 104 receives the message sent from another information processing device via the communication I/O 2. In step 602, the communication message control unit 104 uses the message analyzing unit 108 to verify whether the value of the CRC calculated from the predetermined verification target and the value of the CRC assigned to the footer information 515 are a match. In step 603, the communication message control unit 104 proceeds to step 604 when there is no error in the CRC verified in step 602, and ends the processing when there is an error in the CRC verified in step 602, and executes the predetermined error processing defined based on the CAN. In step 604, the decryption processing unit 109 acquires the decryption key from the key management unit 103, and decrypts the message in which the CRC was determined to be free from error in step 603.

In step 605, the communication message control unit 104 uses the message analyzing unit 108 and acquires the CAN-ID included in the header information 511 of the received message, refers to the verification rule information storage unit 110, and acquires the processing type 812 of the CAN-ID. In step 606, the communication message control unit 104 proceeds to step 607 when the processing type 812 acquired in step 605 is "XOR", and proceeds to step 608 when the processing type 812 is "insert". In step 607, the recency information management unit 102 uses the message analyzing unit 108 and acquires the data field 512, acquires the recency information to be shared between the respective information processing devices 20 from the communication information storage unit 107, and performs the exclusive OR processing of the data field 512 and the recency information.

In step 608, the malicious message verification unit 111 performs the malicious message determination processing for determining whether the received message is a malicious message based on the data field 512 extracted from the received message in step 601, or the output data of the exclusive OR processing of the data field 512 and the recency information performed in step 607. The specific contents of the malicious message determination processing will be explained later with reference to the flowchart of FIG. 7. In step 609, the malicious message verification unit 111 proceeds to step 612 when it is determined that the received message is a malicious message in step 608, and proceeds to step 610 when it is determined that the received message is not a malicious message.

In step 610, the communication message control unit 104 uses the synchronization processing unit 112 and verifies whether it is the timing to perform the synchronization processing. For example, a threshold is set to perform the synchronization processing according to the number of communication messages for each CAN-ID, the counter value, which is updated each time a communication message is received, and the threshold are compared, and it is determined that it is the timing to perform the synchronization processing when the counter value and the threshold are a match. Needless to say, time information or the like may be used in substitute for the number of communication messages. In step 611, the communication message control unit 104 proceeds to step 612 upon using the synchronization processing unit 112 and determining that it is the timing of the synchronization processing, and proceeds to step 614 upon determining that it is not the timing of the synchronization processing.

In step 612, the communication message control unit 104 uses the synchronization processing unit 112 and generates a synchronizing message. For example, the communication message control unit 104 generates a message containing the synchronizing CAN-ID and the recency information. Furthermore, a code such as a MAC may also be assigned in order to certify the completeness of the recency information.

In step 613, the communication message control unit 104 sends the synchronizing message generated in step 612 via the communication I/O 2. In step 614, the communication message control unit 104 executes predetermined control processing based on the received message which was determined as not being a malicious message in step 609.

The transmission information processing device 21 receives the synchronizing message output in step 613 via the communication I/O 2. The transmission information processing device 21 determines whether the recency information contained in the synchronizing message assigned by the reception information processing device 22, and the recency information retained in the transmission information processing device 21 are a match. When the recency information is not a match, for instance, the transmission information processing device 21 causes the recency information management unit 102 of the transmission information processing device 21 to update the recency information based on the recency information contained in the synchronizing message. The transmission information processing device 21 can synchronize the recency information between the information processing devices by causing the recency information used by the transmission information processing device 21 to be the same as the recency information contained in the synchronizing message.

Based on the steps described above, when the control unit 1 in the reception information processing device 22 receives a message of the data structure shown in FIG. 5 from another information processing device, it is possible to analyze the data structure of the received message by using the message analyzing unit 108, and determine whether the received message is a malicious message.

Figure 7:
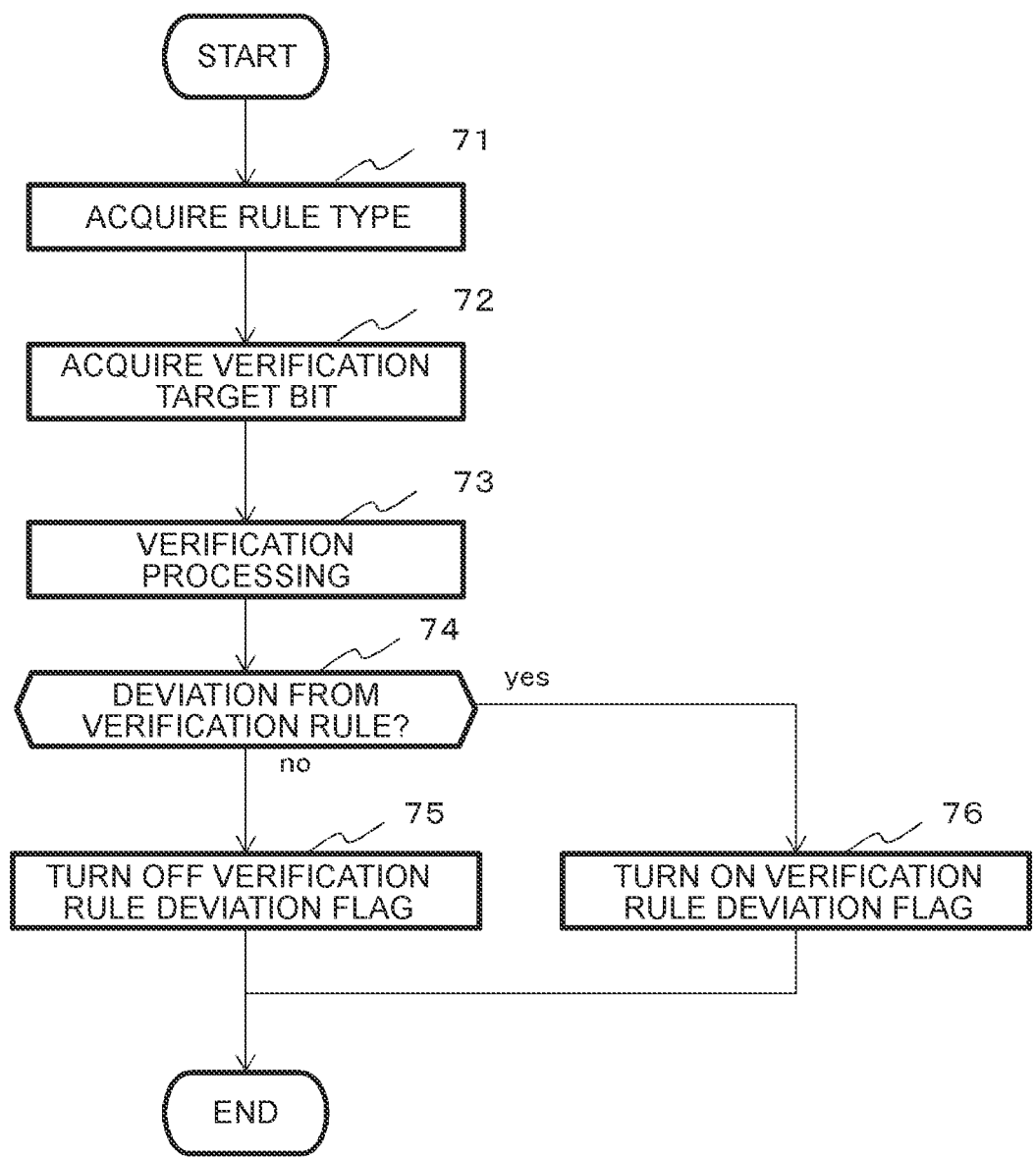
FIG. 7 is a flowchart showing an example of the malicious message determination processing performed in the information processing device.

FIG. 7 is a flowchart showing an example of the malicious message determination processing performed in the information processing device 20. FIG. 7 shows a schematic processing flow of the malicious message determination processing executed in step 608 of FIG. 6.

In step 71, the malicious message verification unit 111 acquires the rule type 813 corresponding to the CAN-ID of the received message from the verification rule information storage unit 110. In step 72, the malicious message verification unit 111 acquires the verification target bits 814 corresponding to the CAN-ID of the received message from the verification rule information storage unit 110. In step 73, the malicious message verification unit 111 verifies whether the received message is a malicious message based on the rule type and the verification target bits acquired in step 71 and step 72.

For example, when the rule type is "counter", whether the recency information inserted into the verification target bits 814 and the recency information retained in the reception information processing device are a match is verified. When the rule type is "fixed", whether the value of the bits described in the verification target bits 814 has not changed from a predetermined value is verified. When the rule type is "range", whether the value of the bits described in the verification target bits 814 is within a range from a predetermined minimum value to a maximum value is verified. When the rule type is "checksum", whether the value of the bits described in the verification target bits 814 and the value of the checksum calculated based on a predetermined checksum calculation method are a match is verified. Note that, as this type of rule type, a plurality of rules may be applied to one CAN-ID.

In step 74, the malicious message verification unit 111 proceeds to step 76 when it is determined that the verification rule has been deviated in step 73, and proceeds to step 75 when it is determined that the verification rule has not been deviated. In step 75, the malicious message verification unit 111 turns "OFF" the verification rule deviation flag, and proceeds to step 610 based on the flag obtained in step 609. In step 76, the malicious message verification unit 111 turns "ON" the verification rule deviation flag, and proceeds to step 612 based on the flag obtained in step 609.

Based on the steps described above, the reception information processing device 22 can determine whether the received message is a malicious message.

According to the foregoing embodiment, the following operations and effects can be obtained.

(1) An information processing device 20 receives, from another information processing device, a communication message generated based on recency information and control data. The information processing device 20 comprises a recency information generation unit 101 which generates the recency information, and a recency information management unit 102 which extracts the recency information from the received communication message. In this embodiment, the communication message generated based on the recency information and the control data is received, and the recency information is extracted from the received communication message. Accordingly, it is possible to verify the communication message without increasing the number of messages.

(2) The recency information is updated according to the synchronizing communication message. Thus, even if a replay attack of intercepting and acquiring a message on a communication path in advance is carried out, it is possible to detect that the resent message is a malicious message. In other words, the communication message resent using a replay attack contains recency information of a point in time that is older than the point in time that the receiving-side information processing device will decrypt the communication message. It is thereby possible to prevent a replay attack.

(3) The recency information management unit 102 updates the recency information according to the communication message, and, based on a synchronizing communication message containing the recency information, synchronizes the recency information to be updated by the recency information management unit 102 with the recency information to be updated by the other information processing device. As a result of adopting the foregoing configuration, the receiving-side information processing device, which received the communication message generated based on the recency information and the control data, can synchronize with the recency information of the transmitting-side information processing device. In other words, it is possible to cause the recency information updated in each information processing device 20 to be the same.

(4) The communication message is generated by assigning the recency information to the control data within a range of a predetermined data length. As a result of adopting the foregoing configuration, it is possible to detect a malicious message without increasing the number of messages. Because the number of messages will not increase, it is possible to prevent the increase in the communication load resulting from the increase in the number of messages. Moreover, because recency information is assigned to the data field of the control data via insertion or exclusive OR, it is possible to verify a malicious message without changing the communication protocol.

(5) The information processing device 20 further comprises a verification rule information storage unit 110 which stores a verification rule according to a type of the control data, and a malicious message verification unit 111 which verifies true/false (correct/incorrect) of the control data based the verification rule. In this embodiment, the verification rule according to the CAN-ID assigned to each type of control data is stored, and a malicious message is detected based on the verification rule. As a result of adopting the foregoing configuration, it is possible to change the verification rule according to the type of control data. Because the verification rule is not transmitted over a network, it is possible to prevent the verification rule from being wrongfully acquired.

(6) A type of the control data and a data verification area are associated and stored in the verification rule information storage unit 110, and the malicious message verification unit 111 verifies true/false of the control data based on data of the data verification area. As a result of adopting the foregoing configuration, it is possible to change the data verification area according to the type of control data. Because the data verification area is not transmitted over a network, it is possible to prevent the data verification area from being wrongfully acquired.

(7) The malicious message verification unit 111 verifies true/false of the control data based on at least one among a verification using a minimum value and a maximum value of the control data, a verification using a predetermined area of the control data, or a verification using a checksum of the control data as the verification rule. As a result of adopting the foregoing configuration, it is possible to change the data verification method according to the type of control data.

(8) The information processing device 20 further comprises a synchronization processing unit 112 which, when the malicious message verification unit 111 determines that the control data is not legitimate data, generates a synchronizing communication message containing the recency information to be updated by the recency information management unit 102, and sends the generated synchronizing communication message to the other information processing device. As a result of adopting the foregoing configuration, when a malicious message is received, it is possible to synchronize the recency information between the respective information processing devices.

(9) The synchronization processing unit 112 generates a synchronizing communication message in a predetermined cycle irrespective of a result of the verification by the malicious message verification unit 111, and sends the generated synchronizing communication message to the other information processing device. As a result of adopting the foregoing configuration, it is possible to synchronize the recency information between the respective information processing devices in a predetermined cycle.

(10) The recency information management unit 102 calculates an exclusive OR of the received communication message and the recency information, and extracts the recency information from the received communication message. As a result of adopting the foregoing configuration, it is possible to assign the recency information to the control data without increasing the number of messages.

The following modified examples are fall within the scope of the present invention, and one or more modified examples may be combined with the foregoing embodiment.

Modified Example 1

While the foregoing embodiment and the modified examples explained a case of using a CAN as the communication standard, the present invention is not limited thereto, and, for example, a CAN-FD or the Ethernet (registered trademark) may also be applied. While the data length of a CAN is a fixed length of 8 bytes, the data length of a CAN-FD is a variable length between 8 bytes to 64 bytes, and the data length is decided for each CAN-ID. Thus, when the data field of the CAN-ID is not using all 64 bytes, a method of embedding the recency information in the free space within the data field may be added. In the case of the Ethernet, a rule which is applied by using a source address or the like may be selected in substitute for the CAN-ID.

Modified Example 2

While the foregoing embodiment and modified examples explained a case of using an in-vehicle network, the information processing device is not limited thereto, and the information processing device can also be applied to a device in a control system or an information system.

While various embodiments and modified examples were explained above, the present invention is not limited to the subject matter of such embodiments and modified examples. Other modes that can be conceived within the range of the technical concept of the present invention also fall within the scope of the present invention.

For example, the present invention can be applied to various types of information processing devices which receive, from another information processing device, a communication message generated based on recency information and control data, and comprise a recency information generation unit which generates the recency information, and a recency information management unit which extracts the recency information from the received communication message.

Moreover, the present invention can also be applied to a method of detecting, in another information processing device, whether a communication message generated by one information processing device based on recency information and control data is a malicious message, comprising the steps of a processor of the one information processing device generating the recency information, and a processor of the other information processing device extracting the recency information from the communication message.

The disclosure of the following priority application is incorporated herein by reference. Japanese Patent Application No. 2015-218336 (filed on Nov. 6, 2015)

REFERENCE SIGNS LIST 1 control unit
2 communication I/O
3 bus
20 information processing device
101 recency information generation unit
102 recency information management unit
110 verification rule information storage unit
111 malicious message verification unit
112 synchronization processing unit

The invention claimed is:
1. A first information processing device that receives, from a second information processing device, a communication message generated based on recency information and control data, the first information processing device comprising:
a hardware processor programmed to:
generate the recency information;
extract the recency information from the received communication message; and update the recency information according to the communication message, and, based on a synchronizing communication message containing the recency information, synchronize the recency information in the first information processing device with the recency information in the second information processing device;

wherein the recency information is a pseudo-random number sequence generated from a seed, the seed is updated each time a byte length of the pseudo-random number sequence reaches a predetermined number, the updated seed is encrypted, and the encrypted updated seed is sent to the second information processing device.

2. The first information processing device according to claim 1, wherein:

the communication message is generated by assigning the recency information to the control data within a range of a predetermined data length.

3. The first information processing device according to claim 1, wherein the processor:

stores a verification rule according to a type of the control data; and verifies true/false of the control data based on the verification rule.

4. The first information processing device according to claim 3, wherein:

a type of the control data and a data verification area are associated and stored in the processor; and the processor verifies true/false of the control data based on data of the data verification area.

5. The first information processing device according to claim 3, wherein:

the processor verifies true/false of the control data based on at least one among a verification using a minimum value and a maximum value of the control data, a verification using a predetermined area of the control data, or a verification using a checksum of the control data as the verification rule.

6. The first information processing device according to claim 3, wherein:

when the processor determines that the control data is not legitimate data, the processor generates a synchronizing communication message containing the updated recency information, and sends the generated synchronizing communication message to the second information processing device.

7. The first information processing device according to claim 3, wherein:

the processor generates a synchronizing communication message containing the updated recency information, and sends the generated synchronizing communication message to the second information processing device; and the processor generates the generated synchronizing communication message in a predetermined cycle irrespective of a result of verification, and sends the generated synchronizing communication message to the second information processing device.

8. The first information processing device according to claim 1, wherein:

the processor calculates an exclusive OR of the received communication message and the recency information, and extracts the recency information from the received communication message.

9. A method of detecting whether a communication message generated by a first information processing device based on recency information and control data is a malicious message, in a second information processing device, the method comprising:

generating the recency information by a processor of the first information processing device;

extracting the recency information from the communication message by a processor of the second information processing device; and updating the recency information according to the communication message, and, based on a synchronizing communication message containing the recency information, synchronizing the recency information in the first information processing device with the recency information in the second information processing device;

wherein the recency information is a pseudorandom number sequence generated from a seed, the seed is updated each time a byte length of the pseudo-random number sequence reaches a predetermined number, the updated seed is encrypted as a plain text, and the encrypted updated seed is sent to the second information processing device.

10. The malicious message detection method according to claim 9, wherein:

the communication message is generated by assigning the recency information to the control data within a range of a predetermined data length.

* * * * *